United States Patent [19]

Johnson

[11] Patent Number: 5,020,273
[45] Date of Patent: Jun. 4, 1991

[54] SEED GERMINATING DEVICE AND METHOD OF USE

[76] Inventor: Jesse D. Johnson, 133 Lake View La., Brighton, Mich. 48116

[21] Appl. No.: 409,609

[22] Filed: Sep. 18, 1989

[51] Int. Cl.$^5$ .............................................. A01L 1/02
[52] U.S. Cl. ...................................................... 47/61
[58] Field of Search .................. 47/59, 60, 61, 62, 14, 47/16, 63–65, 15

[56] References Cited

U.S. PATENT DOCUMENTS

| | | | |
|---|---|---|---|
| 2,677,217 | 9/1951 | Pentler | 47/61 |
| 2,789,399 | 4/1957 | Finn | 47/58 |
| 2,842,897 | 7/1958 | Finn | 47/9 |
| 2,878,617 | 3/1959 | Finn | 47/1 |
| 3,091,436 | 5/1963 | Finn | 259/95 |
| 3,233,366 | 2/1966 | Nutile et al. | 47/61 |
| 3,292,307 | 12/1966 | Finn | 47/58 |
| 3,900,963 | 8/1975 | Tukacs | 47/58 |
| 4,155,314 | 5/1979 | O'Callaghan et al. | 111/1 |
| 4,224,882 | 9/1980 | Cruse | 111/7 |
| 4,297,810 | 11/1981 | Hansford | 47/9 |
| 4,631,860 | 12/1986 | Broughton | 47/58 |
| 4,658,539 | 4/1987 | Sluis | 47/57.6 |
| 4,750,438 | 6/1988 | Johnson | 111/1 |
| 4,926,598 | 5/1990 | Chung | 47/61 |

Primary Examiner—David A. Scherbel
Assistant Examiner—Michele A. Van Patten
Attorney, Agent, or Firm—Ian C. McLeod

[57] ABSTRACT

A device (10) for germinating seeds (S) is described. The device includes tubes (30) inside the container mounted on a base (31). The seeds are soaked in a solution (A) and then the spent solution (A1) is removed and the seeds are aerated through fluid outlet (22) with cover (23) and cover (12) open, such that air flows through the tubes (30) to the seeds through perforations (30a) in the tubes. The tubes are then removed and the device is carried to the place where the seeds are to be planted.

18 Claims, 4 Drawing Sheets

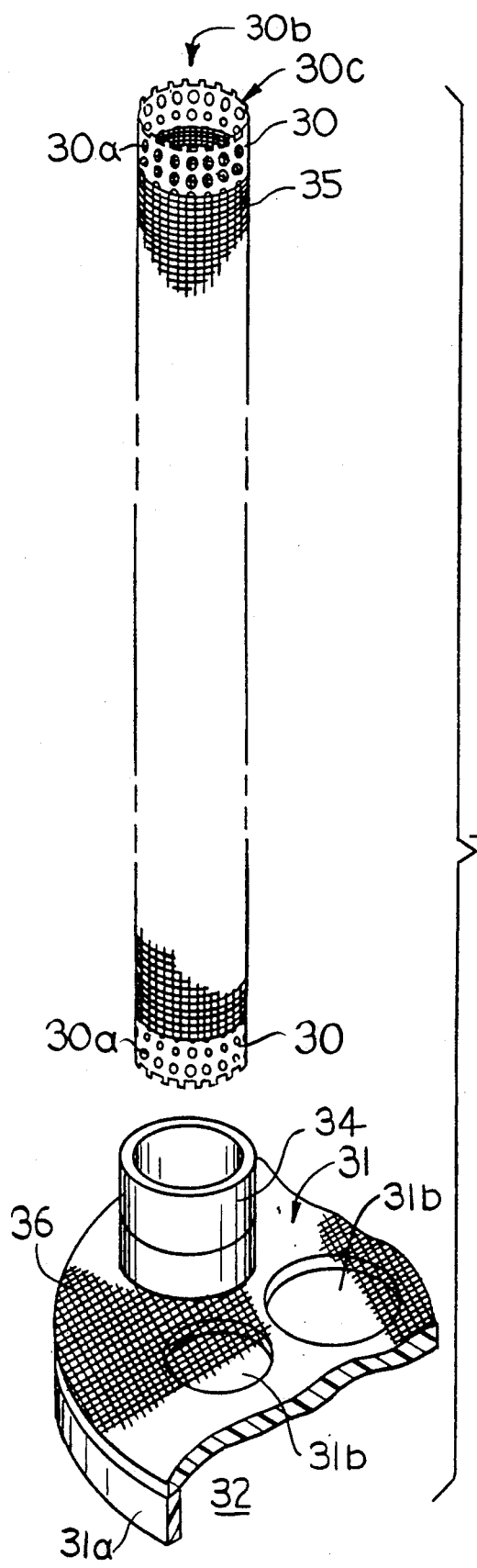
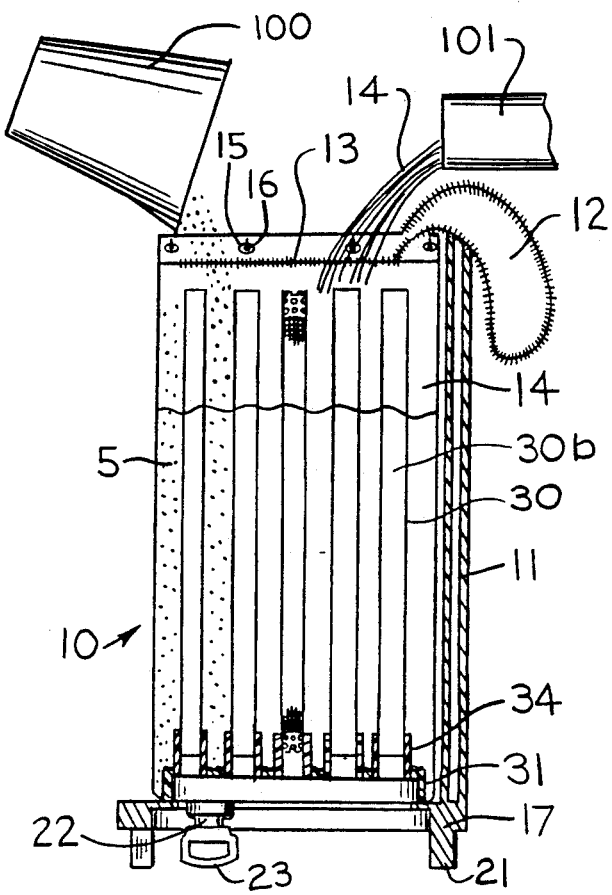
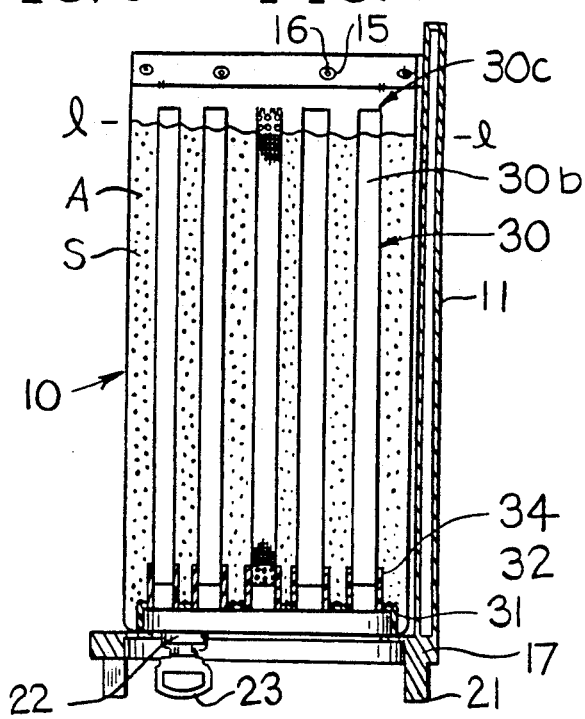
FIG. 6  FIG. 7
FIG. 8

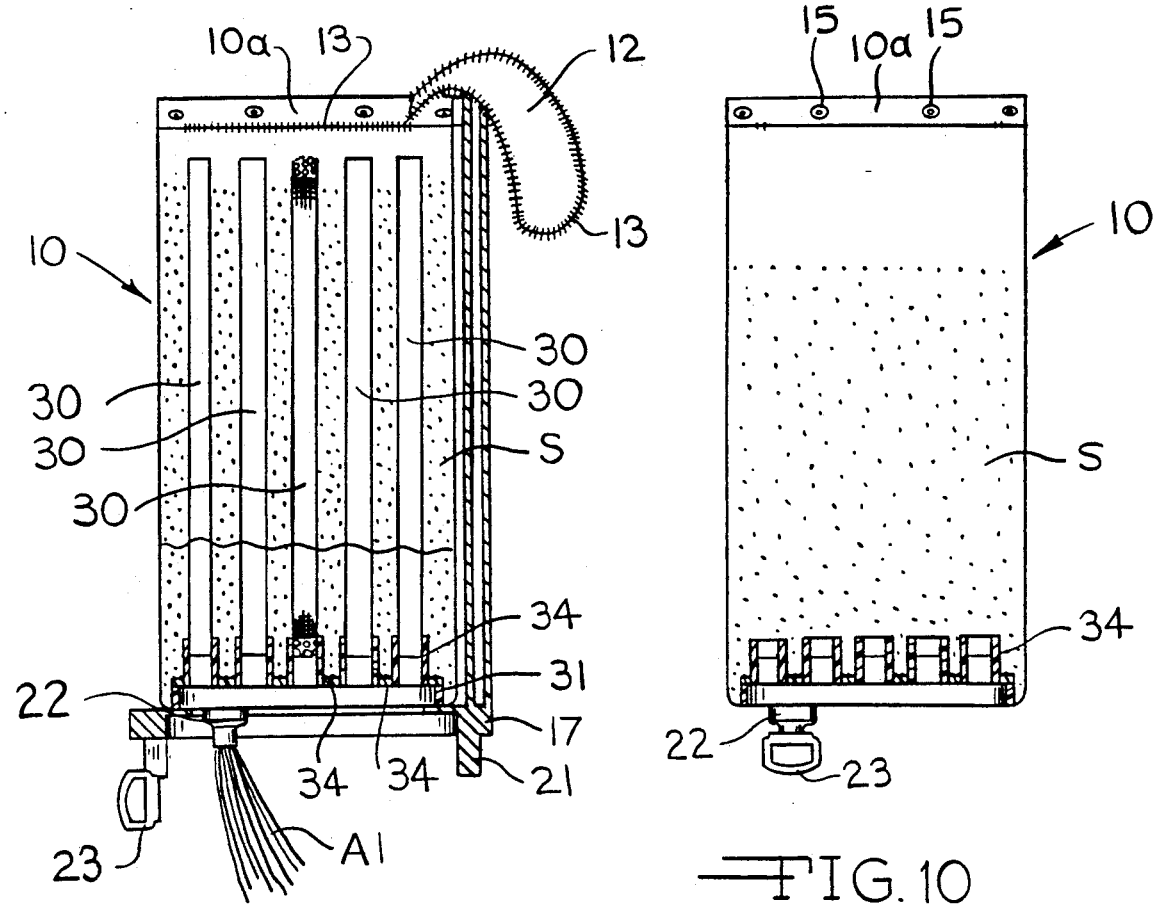

SEED GERMINATING DEVICE AND METHOD OF USE

BACKGROUND OF THE INVENTION (1) Field of the Invention

The present invention relates to a device and method of use for germinating seeds, such as grass or crop seeds. In particular, the present invention relates to a device which allows the seeds to be soaked in an aqueous solution and then aerated for germinating.

(2) Prior Art

Hydroseeding is well known to those skilled in the art. In this method the seeds along with various fibers or the like are broadcast onto prepared ground for planting. Generally the seeds and fibers are deposited on the ground together. The fibers conserve moisture and shield the seeds. Illustrative prior art are U.S. Pat. Nos. 2,789,399; 2,842,897; 2,878,617; 3,091,436 to Finn; and 3,292,307 and 4,297,810 to Hansford. The problem is that the seeds may not germinate after such planting.

U.S. Pat. Nos. 3,900,963 to Tukacs; 4,155,314 to O'-Callaghan et al; 4,224,882 to Cruse; 4,631,860 to Broughton and 4,658,539 to Sluis describe numerous advantages which are obtained from the sowing of germinated seeds. The problem has been to obtain reliable germination.

In the past, those that have tried to pregerminate have basically dumped various amounts of seeds in containers, added water and allowed them to soak for many hours, if not days. The prolonged soaking was not only to activate the seed with the initial imbibition of moisture, but also to reduce the heat buildup that takes place when there is a lack of water which is caused by the metabolic activity (cells dividing) due to the initial activation of the seeds. Due to this heat buildup many processes have been developed which entail removing the seeds from the container, spreading them out into thin layers on plywood boards or trays, then covering or containing them, so as to alleviate evaporation.

Another method to keep the heat down and labor reduced, is to keep the seeds in the same container and simply change the water and/or, add oxygen via air pump aerating water. The problems that exist with this method are oversoaking, which is comparable to a simulated anaerobic condition resulting in a failure to remove the exudates from the seed in the water. These exudates in most cases, need to be oxidized in order to dissipate them.

One method of germinating seeds, used primarily to repair divots, involves, for instance, mixing 150 pounds of dirt, 100 pounds of sand and 50 pounds of seeds. The seeds are kept in a moist state for up to seven days in a layer and watered well and then the seeds are mounded for distribution and planting. Another method involves soaking the seeds in water, which is changed every 12 hours. This soaking is continued until radical emergence from the seeds can be seen. Still another method places the seeds in a burlap sack, soaks them for 12 hours and then dries them for 12 hours at room temperature. This cycle is continued for seven days.

Still another method for drought repair, uses two ounces of a seed starter solution to each 55 gallons of water. The seeds are soaked in this solution, which must be changed every four hours. On the third day the seeds are planted with Milorganite 6-2-0. In another method an aquarium pump provides additional oxygen to water for the seeds, which is changed every 12 hours. Changing the water supply to the seeds giving the seed a constant oxygen supply seems to be a key to the success of the prior art methods. Changing the water also removes seed exudate. Another refinement in the above methods involves placing the seed in 77° F. water, which reduces the time for radical germination in half. U.S. Pat. No. 4,750,438 to Johnson describes a method wherein the seeds are soaked and then spread over a large area for germination.

All of these prior art methods involve the use of a pail for the seed solution and seeds, a pile of the seeds on a tarp or a container for the seeds and have met with limited success. None of the prior art methods provide a device for soaking and then uniformly aerating the seed without handling the seed.

OBJECTS

It is therefore an object of the present invention to provide a method and device for germinating seeds which avoids the need to handle the seeds prior to planting. Further, it is an object of the present invention to provide a method which is simple and economical to perform. Further it is an object of the present invention to provide a device which is inexpensive to construct. These and other objects will become increasingly apparent by reference to the following description and the drawings.

IN THE DRAWINGS

FIG. 1 is a front perspective view of the preferred device of the present invention, particularly showing an outlet 22 at the bottom of a container 10 and a openable cover 12 at the top of the container 10.

FIG. 3 is a plan cross-sectional view along line 3—3 of FIG. 2.

FIG. 4 is a plan cross-sectional view along line 4—4 of FIG. 2.

FIG. 5 is a plan cross-sectional view along line 5—5 of FIG. 2.

FIG. 6 is a a perspective view of the base 31 and a single tube 30.

FIGS. 7 to 10 are front cross-sectional views of the device of the present invention particularly showing the steps in the method of the present invention.

GENERAL DESCRIPTION

Figure 1:
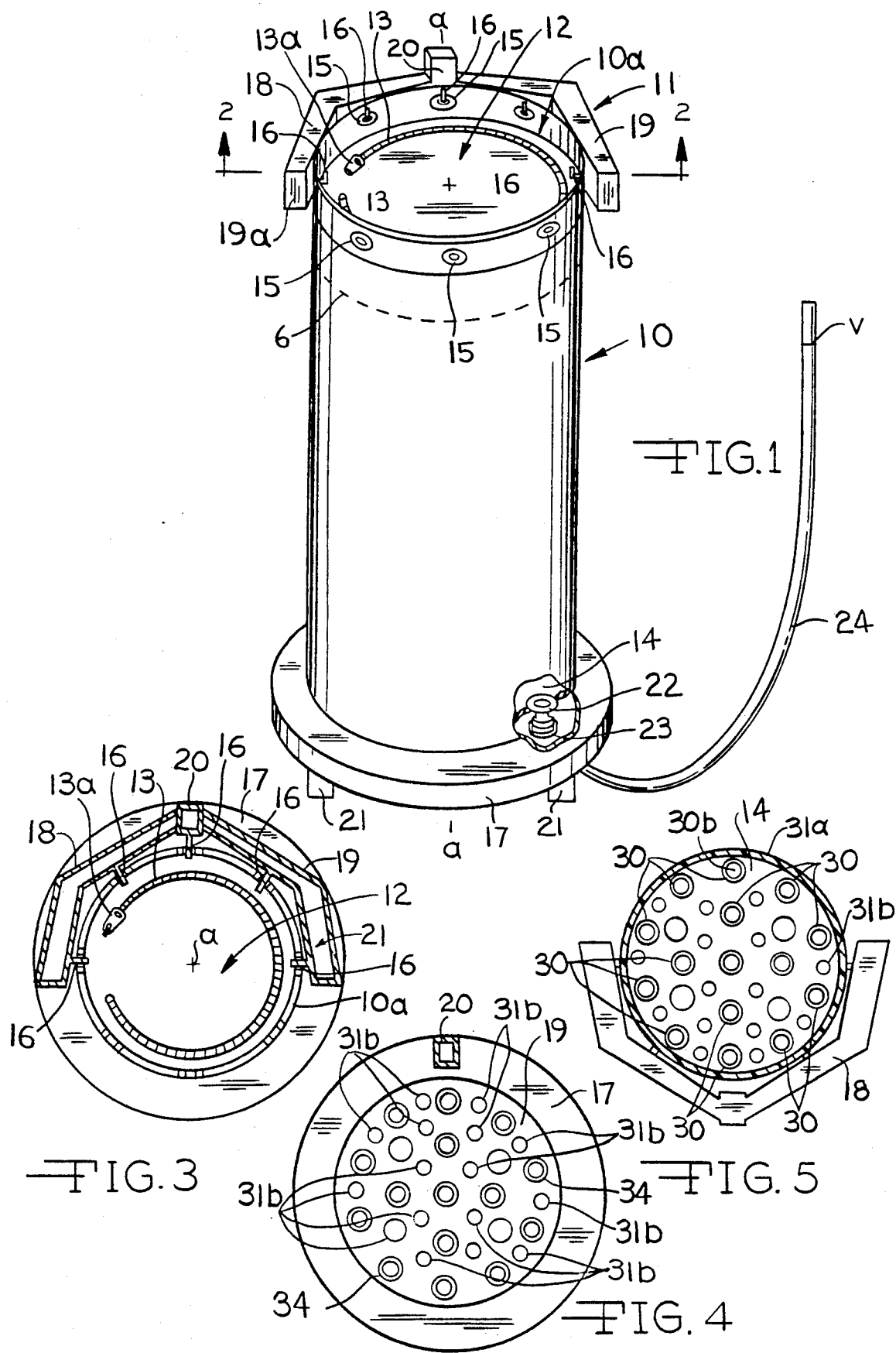

The present invention relates to a device for germinating seeds prior to planting which comprises: container means defining an enclosure for germinating the seeds having an opening and a controlled outlet from the container for fluid removal and for air venting of the enclosure; and aerating means within the enclosure with the seeds which allows air to flow upward through the seeds throughout the container through the outlet to the opening wherein seeds in the container are soaked and then aerated to germinate the seeds. It will be appreciated that various aerating means can be used in the container such as hospital trays and plates supporting the seeds which are perforated to allow air to reach the seeds. It has been found that the preferred device uses vertically oriented, perforated tubes.

Further, the present invention relates to a method for germinating seeds which comprises: providing a device which comprises container means defining an enclosure for germinating the seeds having an opening and a controlled outlet from the container for fluid removal and for air venting of the enclosure; and aerating means within the enclosure with the seeds which allows air to flow upward through the seeds, throughout the container through the outlet to the opening wherein seeds in the container are soaked and then aerated to germinate the seeds; soaking the seeds in an aqueous seed germinating solution for a period of time in the container means and then removing the solution; and aerating the seeds through the aerating means for a period of time in the container means until the seeds are germinated.

The present invention particularly relates to a device for germinating seeds prior to planting which comprises: container means defining an enclosure and having an upper end and a lower end and having an openable and closeable cover means at the upper end and an openable and closeable fluid and air vent conduit means at the lower end; vertically oriented perforated tubular means with an opening along a length of the tubular means between opposed ends and with the length mounted between the upper end and lower end of and in the enclosure of the container means and on a base means in the enclosure which provides a space adjacent to the conduit means, wherein the opening of the tubular means and the space of the base means are connected; and wherein the tubular means has perforations between the opening and the enclosure of the container means; and stand means supporting the container means with the tubular means vertically oriented, wherein in use of the device the seeds are germinated by providing a solution with the seeds in the enclosure with the cover means and conduit means closed and then the seeds are retained in the enclosure without the solution for aeration with the cover means and conduit means open.

Further still, the present invention relates to a method for germinating seeds which comprises: container means defining an enclosure and having an upper end and a lower end and having an openable and closeable cover means at the upper end and an openable and closeable fluid outlet means at the lower end; vertically oriented tubular means with an opening along a length of the tubular means between opposed ends with the length mounted between the upper end and lower end of and in the enclosure of the container means and on a base means in the enclosure which provides a space adjacent to the outlet means, wherein the opening of the tubular means and the space of the base means are connected; and wherein in use of the device the seeds are germinated by providing a solution with the seeds in the enclosure with the cover means and conduit means closed and then the seeds are retained in the enclosure without the solution for aeration with the cover means and conduit means open; introducing seeds and an aqueous seed growing solution into the enclosure of the container means with the fluid outlet means closed and the cover means open and then closing the cover means; soaking the seeds in the solution for a period of between about 1 and 48 hours; removing the solution from the seeds by opening the conduit means with the cover means open; allowing the seeds to aerate for a period of about 1 to 5 days with the cover means and fluid outlet means open, to thereby provide the germinated seeds.

Further still, the present invention relates to a device for germinating seeds prior to planting which comprises: container means defining an enclosure and having an upper end and a lower end and having an openable and closeable cover means at the upper end and an openable and closeable fluid outlet and air vent conduit means at the lower end; and vertically oriented tubular means each with an opening along a length of the tubular means between opposed ends with the length mounted between the upper end and lower end of the enclosure of the container means on a base means in the enclosure which provides a space adjacent to the outlet means, wherein the opening of the tubular means and the space of the base means are connected and wherein the tubular means has perforations between the opening and the enclosure of the container means, and wherein in use of the device the seeds are germinated by providing a solution with the seeds in the enclosure with the cover means and conduit means closed and then the seeds are retained in the enclosure without the solution for aeration with the cover means and conduit means open.

SPECIFIC DESCRIPTION

FIGS. 1 to 5 show the preferred seed germinating container 10 of the present invention mounted on a stand 11. It will be appreciated that the container 10 could be a rigid container which stands alone such as a 55 gallon drum (not shown) or it can be as shown in FIG. 1 as a flexible bag. The container 10 preferably has an elongate cylindrical shape and can be constructed of waterproof canvas or vinyl, rubber or the like which can be sewn, solvent welded, or glued together. A cover 12 is provided on the container 10 and a semi-circular zipper 13 with pull tab 13a is used to provide a means for entry into the enclosure 14 of the container 10. Eyelets 15 are provided around the circumference of the upper end 10a of the container 10. The stand 11 is provided with hooks 16 which extend through the eyelets 15. The container 10 is mounted on the stand 11 with the axis a—a of the container 10 vertically oriented. The stand 11 has a base 17 which is open in the center 17a and arms 18 and 19 extending laterally from a post 20 which extends vertically from the base 17. The arms 18 and 19 are open on the underside 21 (FIG. 3) to reduce weight and can be cast and then welded or otherwise secured to post 20 such as with bolts (not shown). Legs 21 are provided on the base 17 to provide access to a conduit 22 which has a removable cap or valve 23 (FIG. 1). Alternatively, a hose 24 can be attached to conduit 22 and lowered for draining the container 10. When the hose 24 is raised, the fluid level L in the container 10 can be determined using a clear plastic hose 24.

Figure 2:
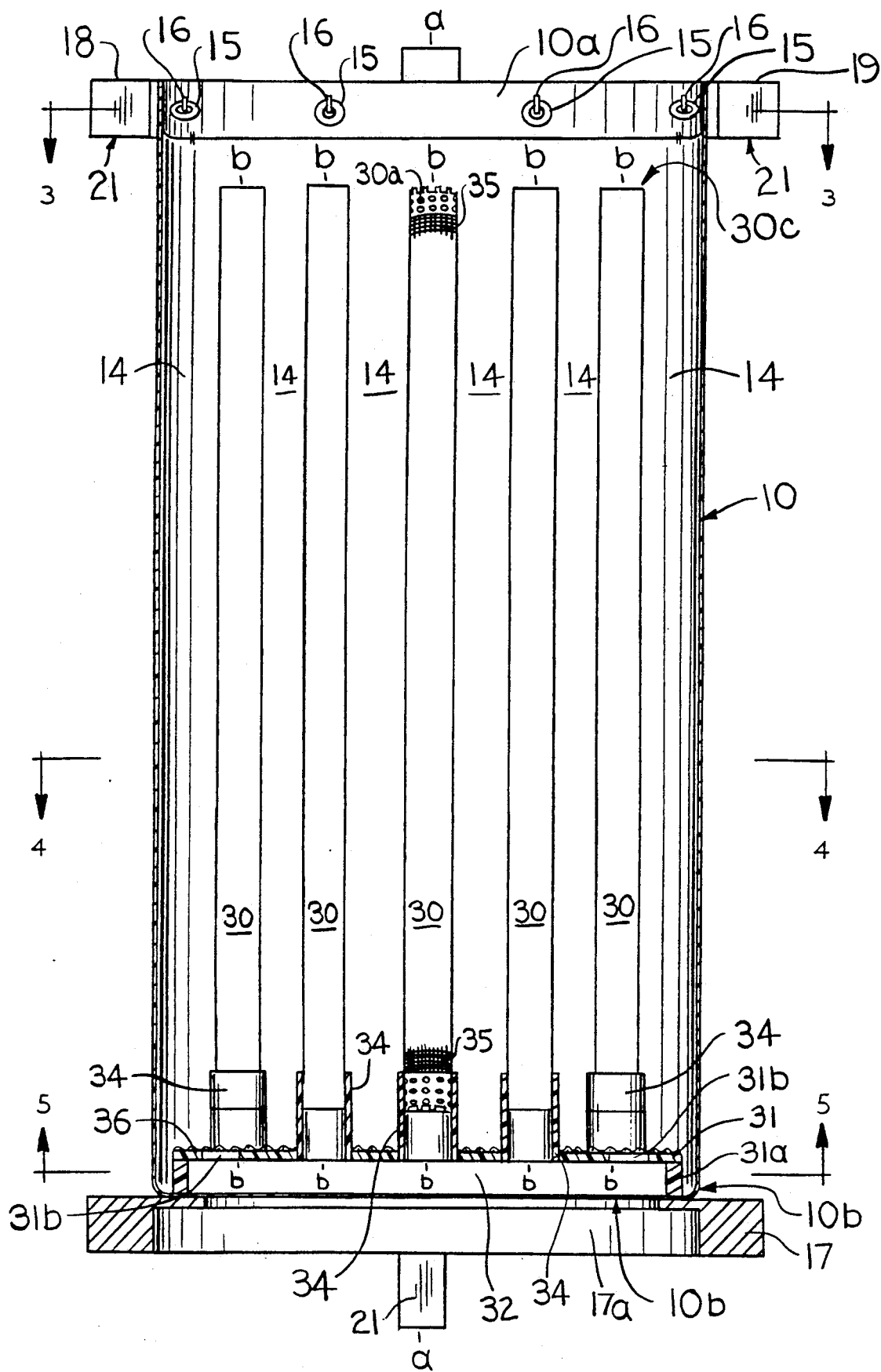
FIG. 2 is a front cross-sectional view along line 2—2 of FIG. 1 showing tubes 30 mounted inside the container in a base.

Inside the container 10, tubes 30 having vertical axis b—b are removeably mounted on a base 31. The base 31 includes a ring 31a which provides a space 32 between the tubes 30 and the lower end 10b of the enclosure 14. As particularly shown in FIG. 6, base 31 includes holes 31b between the enclosure 14 and space 32. Sockets 34 are provided on base 31 for supporting tubes 30 in a vertically oriented position along axis b—b (FIG. 2). Tubes 30 include perforations 30a (only a few are shown for illustration) along their length such that the opening 30b of tube 30 (FIG. 3) is connected to enclosure 14 along the length of the tubes 30 through the perforations 30a. The opening 30b is continuous along the length of the tubes 30. The upper ends 30c of the tubes 30 are spaced from the cover 12 in the enclosure 14. The upper ends 30 of the tubes 30 can be closed to prevent seed from entering the opening 30b. The outside of tubes 30 and the upper surface of base 31 are covered with screens 35 and 36 inside the enclosure 14 to prevent the seeds from moving through the perforations 30a.

FIGS. 7 to 10 show the use of the device 10 of the present invention. As shown in FIG. 7, seeds S in a pail 100 and an aqueous solution A from a hose 101 or other container are introduced into enclosure 14 such that the seeds and solution are at a level 1—1 adjacent to the upper ends 30c of tubes 30. The container 10 is then closed by moving cover 12 in place over the enclosure 14 and zipping the zipper 13 with tab 13a. As shown in FIG. 8, the seeds are then soaked for a period of 1 to 48 hours, preferably 2 to 4 hours. The solution is preferably changed several times by opening cover 12 and cap 23 on outlet 22 or by lowering tube 24 (FIG. 1) to below the conduit 22. As shown in FIG. 9, when the seeds S are soaked sufficiently, the spent solution A1 is drained from the container 10 with the cover 12 open. The seeds S can then be aerated for between about 1 to 5 days, preferably 2 to 4 days. There is natural flow of air through the tubes 30 and enclosure 14 upwards from conduit 22 through the open cover 12 of the container 10. When the seeds S are pregerminated, the tubes 30 are pulled from the sockets 34 in base 31 and the container 10 is removed from stand 11 as shown in FIG. 10. The pregerminated seeds S are then transported in the container 10 to where they are to be planted. Removal of the tubes 30 provides for ease of removal of the pregerminated seeds S from the container 10 for planting; however, it is not essential.

The function of the device of the present invention, such as the germination bag or a drum, is to sprout the seeds and accelerate establishment, thus saving time, labor, water and erosion or inclement weather problems. The device of the present invention provides the seeds with:

(1) Temperature control due to the passive convection flow that takes place through the vertical screened aeration tubes 30.

(2) Proper humidity due to the containment of moisture, but the seeds are not submerged so as to over soak after the soaking periods. Also the initial soaking period and subsequent rinses of 200 pounds of Perennial Rye grass, for instance, take approximately 50 gallons of water, whereas, if you were to spread 200 pounds of Perennial Rye grass seeds were spread on the ground, they would cover approximately 1 acre, take 6 to 10 days to sprout and use 27,000 gallons of water.

(3) Reduced handling due to the fact that the seeds do not need to be removed from the container 10 until they have come to term.

(4) Aeration is an important factor. The vertical screened tubes 30 are placed on the base 31 which provides a pocket of air in space 32 below the base 31. This base 31 covers the diameter of the container 10. The vertical screened tubes 30 connected to the base 31 extend from the base 31 to above the seed level, so as seed starts to heat up, these vertical screened tubes 30 vent off the heat via passive convection through the tubes 30. This principle works for a few pounds or a few hundred pounds of seeds. The strategically placed screened tubes 30 provide sufficient surface area throughout the container 10. The distance of the tubes 30 are arranged so as to create a depth or density of seeds that will allow the seeds to breath sufficiently. The depth (or density of seeds) varies with species or size of the seeds; i.e. Bentgrass being a very small or fine seed needs more surface area or less depth of seed in between screened tubes 30, whereas a larger seed such as corn, could tolerate less surface area, or a larger depth of seeds between the tubes 30.

GERMINATION PROCESS

The following is a description of the preferred process of germinating 200 pounds of turf seed, Perennial Rye or Blue Grass seed.

The container 10 was positioned by a drain. The base 31 was placed in the container 10. The vertical screened tubes 30 were placed in sockets 34. Data cards can be used with the device to record times. The valve 23 was set in the closed position and seeds were slowly poured into the container 10, so as not to move the screened tubes 30. The seeds were below the upper ends of the tubes 30c. The container 10 was filled with water at room temperature. The data card was marked as to the time the seeds started to soak. The seeds were allowed stand in the water for three (3) hours but do not exceed four (4) hours.

It was found that all seeds have a different soak time. If the soak time is exceeded, the seeds will not only sprout and grow at a much slower rate, but actual physical damage to the seeds can be expected; i.e. grass seeds soaked at three hours will sprout and grow about 6 to 7 times faster than seeds soaked overnight or 24 hours. The seeds were drained after three hours by opening the conduit 22 and valve 23 remained open. The drain valve 23 remained open to allow the seed to mature. The germinated seeds may need a periodic rinse every 12 to 24 hours to keep them from drying out before planting. The cover 12 was also open to allow aeration.

The aqueous solution can include seed growth stimulants, particularly those providing phosphorus and nitrogen which aid in germinating the seeds. All of this is known to those skilled in the art.

It is intended that the foregoing description be only illustrative and that the present invention be limited only by the hereinafter appended claims.

I claim:

1. A device for germinating seeds prior to planting which comprises:

(a) container means defining an enclosure for germinating the seeds having an opening and a controlled outlet from the container for fluid removal and for air venting of the enclosure; and (b) vertically oriented perforated tubular means within the enclosure with the seeds which allows air to flow upward through the seeds throughout container through the outlet to the opening wherein seeds in the container are soaked and then aerated to germinate the seeds.

2. A device for germinating seeds prior to planting which comprises:

(a) container means defining an enclosure and having an upper end and a lower end and having an openable and closeable cover means at the upper end and an openable and closeable fluid outlet and air vent conduit means at the lower end; and (b) vertically oriented perforated tubular means each with an opening along a length of the tubular means between opposed ends with the length mounted between the upper end and lower end of the enclosure of the container means on a base means in the enclosure which provides a space adjacent to the outlet means, wherein the opening of the tubular means and the space of the base means are connected and wherein the tubular means has perforations between the opening and the enclosure of the container means, wherein in use of the device the seeds are germinated by providing a solution with the seeds in the enclosure with the cover means and conduit means closed and then the seeds are retained in the enclosure without the solution for aeration with the cover means and conduit means open.

3. The device of claim 2 wherein an outside surface of the tubular means in the enclosure is covered between opposed the ends with a screen means such that seeds provide in the enclosure means in the container means are prevented from moving into the opening of the tubular means.

4. The device of claim 2 wherein the base means is provided with passages between the enclosure of the container means and the space of the base means and wherein an upper surface of the base means in the enclosure of the container means is covered with a screen means such that seeds in the enclosure means are prevented from moving into the space of the base means.

5. The device of claim 2 wherein the cover means is constructed of a waterproof flexible material including a flap with a zipper which partially extends around the cover means so that the flap is attached to the container means when open.

6. The device of claim 2 wherein the container means and cover means are constructed of a waterproof, flexible material and wherein the container means is constructed as an elongate cylinder.

7. The device of claim 2 wherein the cover means is a flap with a zipper which partially extends around a circumference of the cover means so that the flap is attached to the container means when open.

8. The device of claim 2 wherein the container means and cover means are constructed of a waterproof, flexible material, wherein the container means is constructed as an elongate cylinder, wherein the cover means is a flap with a zipper which partially extends around a circumference of the cover means so that the flap is attached to the container means when open, wherein the container means is supported externally on the upper end on a stand means, wherein an outside surface of the tubular means in the enclosure is covered between the ends with a screen means such that seeds provided in the enclosure means in the container means are prevented from moving into the opening of the tubular means, wherein the base means is provided with passages between the enclosure of the container means and the space of the base means and wherein an upper surface of the base means in the enclosure of the container means is covered with a screen means such that seeds in the enclosure means are prevented from moving into the space of the base means.

9. A device for germinating seeds prior to planting which comprises:
 (a) container means defining an enclosure and having an upper end and a lower end and having an openable and closeable cover means at the upper end and an openable and closeable fluid and air vent conduit means at the lower end;
 (b) vertically oriented perforated tubular means with an opening along a length of the tubular means between opposed ends and with the length mounted between the upper end and lower end of and in the enclosure of the container means on a base means in the enclosure which provides a space adjacent to the conduit means, wherein the opening of the tubular means and the space of the base means are connected and wherein the tubular means has perforations between the opening and the enclosure of the container means; and
 (c) stand means supporting the container means with the tubular means vertically oriented, wherein in use of the device the seeds are germinated by providing a solution with the seeds in the enclosure with the cover means and conduit means closed and then the seeds are retained in the enclosure without the solution for aeration with the cover means and conduit means open to aerate and germinate the seeds.

10. The device of claim 9 wherein the container means is supported on the upper end on the stand means.

11. The device of claim 10 wherein hooks are provided on the stand means which engage eyelets on the upper end of the container means to support the container means on the stand means.

12. The device of claim 9 wherein an outside surface of the tubular means in the enclosure is covered between the opposed ends with a screen means such that seeds provided in the enclosure of the container means are prevented from moving into the opening of the tubular means.

13. The device of claim 9 wherein the base means is provided with passages between the enclosure of the container means and the space of the base means and wherein an upper surface of the base means in the enclosure of the container means is covered with a screen means such that seeds in the enclosure means are prevented from moving into the space of the base means.

14. The device of claim 9 wherein the cover means is constructed of a waterproof flexible material including a flap with a zipper which partially extends around the cover means so that the flap is attached to the container means when open.

15. The device of claim 9 wherein the tubular means are multiple perforated tubes with a tubular screen around an outside surface of each of the tubes in the enclosure of the container means, wherein the tubes are each removeably mounted in separate sockets in the base means, wherein the base means is provided with passages between the enclosure of the container means and the space of the base means and wherein an upper surface of the base means in the enclosure of the container means is covered with a screen means such that seeds in the enclosure are prevented from moving into the space of the base means.

16. The device of claim 9 wherein the container means and cover means are constructed of a waterproof, flexible material and wherein the container means is constructed as an elongate cylinder.

17. The device of claim 16 wherein the cover means is a flap with a zipper which partially extends around a circumference of the cover means so that the flap is attached to the container means when open.

18. The device of claim 9 wherein the container means and cover means are constructed of a waterproof, flexible material, wherein the container means is constructed as an elongate cylinder, wherein the cover means is a flap with a zipper which partially extends around a circumference of the cover means so that the flap is attached to the container means when open, wherein the container means is supported on the upper end on the stand means, wherein an outside surface of the tubular means in the enclosure is covered between the ends with a screen means such that seeds provided in the enclosure means in the container means are prevented from moving into the opening of the tubular means, wherein the base means is provided with passages between the enclosure of the container means and the space of the base means and wherein an upper surface of the base means in the enclosure of the container means is covered with a screen means such that seeds in the enclosure means are prevented from moving into the space of the base means.

* * * * *